Figure 1:
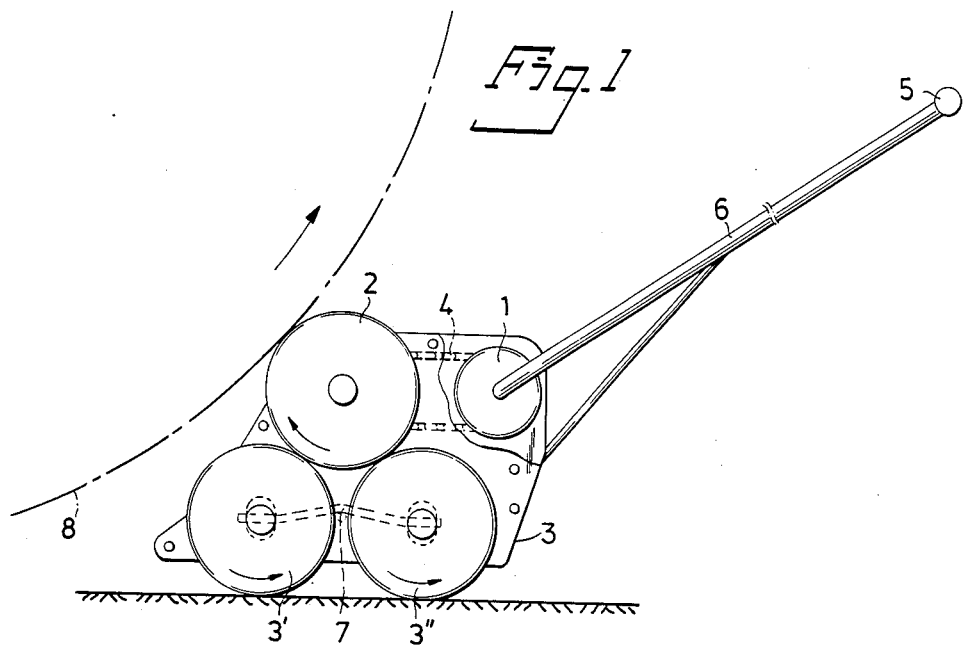

United States Patent [19]

Englund

[11] Patent Number: 4,582,154
[45] Date of Patent: Apr. 15, 1986

[54] DRIVE APPARATUS

[76] Inventor: Pege Englund, 32, Tallbacksvägen, 610 14 Rejmyre, Sweden

[21] Appl. No.: 629,789
[22] PCT Filed: Nov. 21, 1983
[86] PCT No.: PCT/SE83/00407
§ 371 Date: Jul. 6, 1984
§ 102(e) Date: Jul. 6, 1984
[87] PCT Pub. No.: WO84/02119
PCT Pub. Date: Jun. 7, 1984

[30] Foreign Application Priority Data

Dec. 1, 1982 [SE] Sweden .................. 8206854

[51] Int. Cl.$^4$ .............................. B60P 3/06
[52] U.S. Cl. ..................... 180/74; 180/14.1; 74/13
[58] Field of Search ............. 180/74, 14.1, 20, 198, 180/199, 200, 201, 203; 280/702, 704; 105/89, 90 R, 90 A; 74/13–15, 214–216

[56] References Cited

U.S. PATENT DOCUMENTS

| 2,432,156 | 12/1947 | Hill .................. 105/141 |
| 2,751,990 | 6/1956 | Finlay et al. ........... 180/6.2 |
| 2,861,643 | 11/1958 | Wald, Jr. et al. ........ 180/74 |
| 4,125,029 | 11/1978 | Krezak et al. ........... 74/13 |
| 4,318,448 | 3/1982 | Cline ................. 180/14.1 |

FOREIGN PATENT DOCUMENTS

| 21463/77 | 11/1980 | Australia . |
| 577345 | 5/1933 | Fed. Rep. of Germany . |
| 2060536 | 6/1972 | Fed. Rep. of Germany . |
| 2050616 | 3/1971 | France . |

Primary Examiner—Richard A. Bertsch
Attorney, Agent, or Firm—Hayes, Davis & Soloway

[57] ABSTRACT

A drive apparatus which in first place is intended for moving vehicles comprises a transportable carriage which has two wheels (3) and a drive roller (2) driven my means of a motor. Spring elements (7) normally keep the drive roller (2) and the support wheels out of contact with each other but by load, for instance when the carriage is pushed in under a vehicle wheel (8) a friction contact is established between the drive roller (2) and the support wheels (3) causing the carriage to move upon rotation of the drive roller at the same time causing the vehicle to be moved and the wheels (8) thereof are rotated. The carriage further has a handle (6) which preferably houses cables, hoses or the like for power supply to the motor and which has control means (5) such as switches or the like.

3 Claims, 4 Drawing Figures

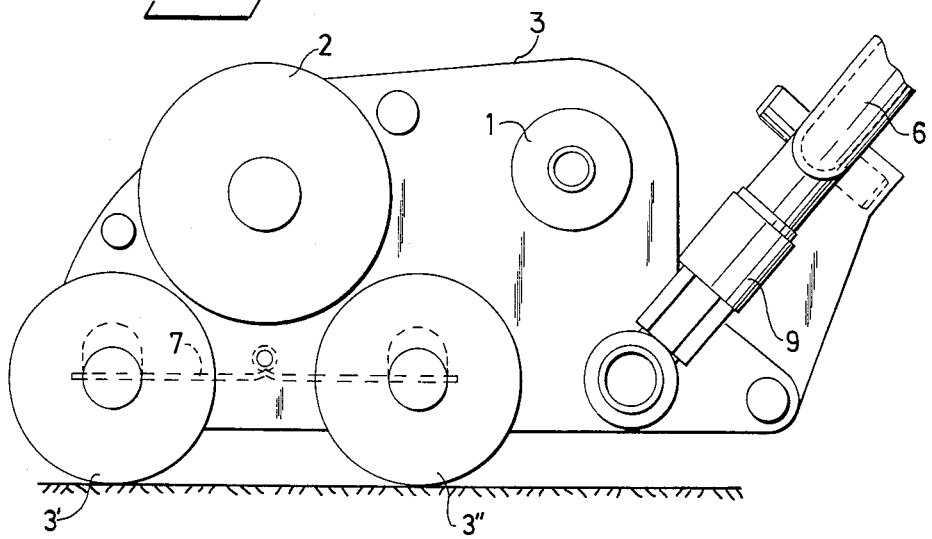
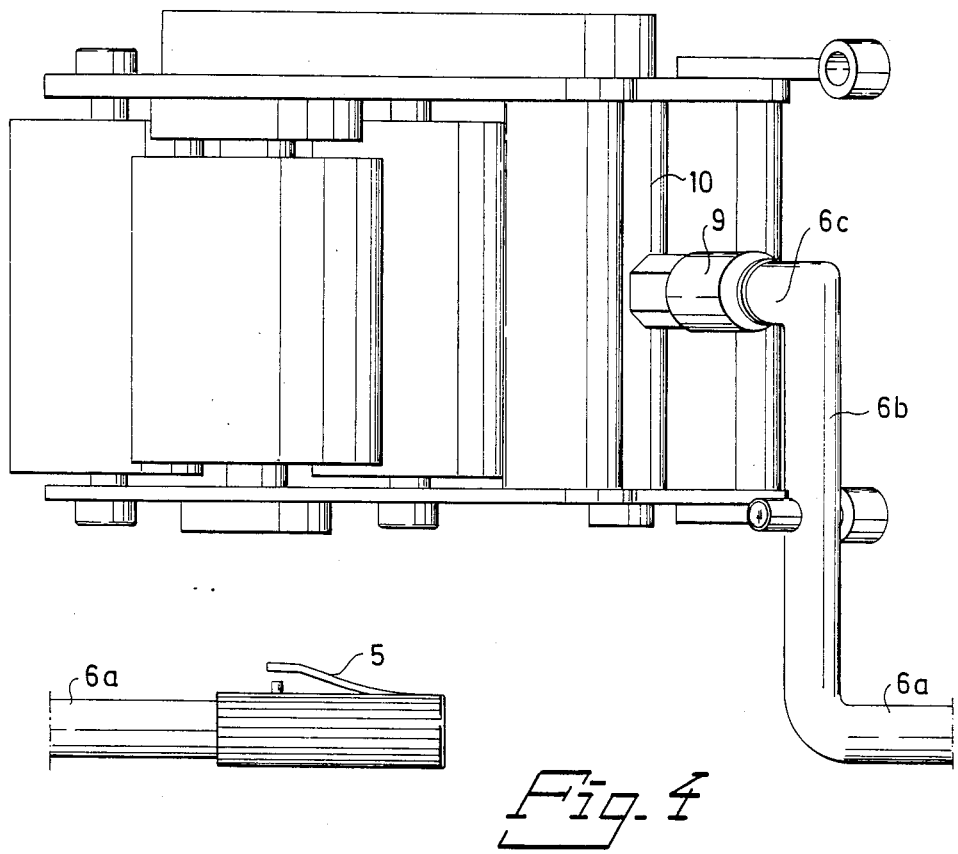

DRIVE APPARATUS

The present invention refers to a drive apparatus which preferably but not exclusively is intended to be used for moving vehicles and the like.

In the manufacturing industry as well as in the repair business it is a need to be able to easily and smoothly move vehicles and similar objects without using the engine that the vehicle may be equipped with. Also in other cases there is a need for an easily operable movable apparatus.

Figure 2:
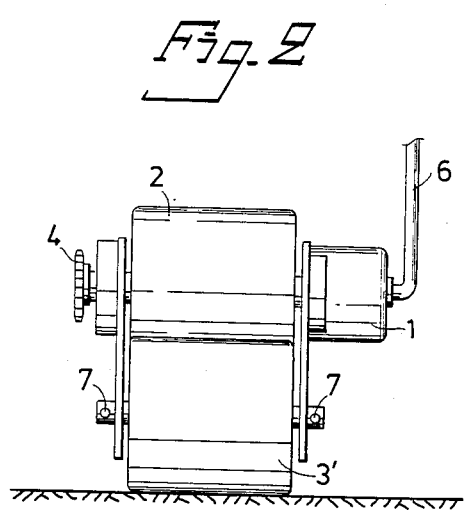

The object of the present invention is to provide such a device and to accomplish this and further objects the invention has the characteristics which appear from the claims. In the accompanying drawing an exemplary embodiment of the invention is illustrated and FIG. 1 is a vertical section through a schematically illustrated drive apparatus while FIG. 2 shows the same drive apparatus in a front view, FIG. 3 is a side view, with one of the side walls removed, of a somewhat modified drive apparatus and FIG. 4 is a plan view of the drive apparatus of FIG. 3.

The drive apparatus illustrated in the drawing is in the shape of a transportable carriage which carries a drive motor 1, which in this instance can be an electric motor or a pneumatically or hydraulically powered motor. The drive motor moves a drive means 2 which in the preferred embodiment consists of a friction roller and in the illustrated example the drive takes place via a chain transmission 4. The carriage 3 is supported by two wide support wheels 3', 3 the non-rotatable shafts of which being bored through and inserted in oblong holes in the support plates of the carriage. Since a spring means 7 fixed at the central part thereof, has the ends thereof inserted in said bores in the shafts of the support wheels the shafts will be resilient. Normally the shafts are located somewhat lower than in FIG. 1 and the support wheels 3', 3 will consequently be out of contact with the drive roller 2. In this position the carriage can easily be transported. By loading the carriage the support wheels may however be brought into contact with the drive roller 2 and when the latter is driven also the support wheels are consequently driven. Associated to the carriage is a handle 6 which in first place serves to operate the carriage and in second place may serve as protection for cables, hoses or similar means for power supply to the drive motor. In such cases the handle can preferably be shaped as a tube or the like. Control means 5 such as switches, valves and the like may also be secured to the handle such that they are easily accessible for the operator.

The drive apparatus now described is intended to be opeated from the left side but in many instances it is desirable to be able to choose the side from which the device is operated and for this purpose the embodiment in FIG. 3 and FIG. 4 has a handle, which is designed in such a manner that it has a first portion 6a, which continues in a portion 6b at right angles thereto and the latter portion has such a length that it from either side extends to the central portion of the drive apparatus where it via a bent portion 6c continues in a portion 9, which via a sleeve 9 is pivotably connected to the middle of a centrally disposed transverse element 10. Also in this case the handle preferably houses cables, conduits or the like, provided to supply the drive apparatus with energy and the handle further has control means 5 for such purposes. It is also possible to design the connections between the parts 6–10 air and/or fluid proof such that the handle will serve as a conduit for such a fluid. Owing to the shape of the handle and the possibility of pivoting it the drive apparatus can be easily operated from any suitable position.

The apparatus now described may be used in the following manner: If it is desired to use the apparatus to move a vehicle the apparatus is transported to one of the front or rear wheels 8 of the vehicle. By pushing the apparatus into the substantially wedge-shaped space which is constituted between the wheel 8 and the floor or the ground the carriage 3 will be exerted to a load which moves the drive roller 2 and consequently also the rest of the carriage 3 with exception for the support wheels 3', 3 downwardly at which operation as appears from FIG. 1 the drive roller 2 at the same time as it comes in friction contact with the vehicle wheel 8 also comes in friction contact with the support wheels 3', 3". If the drive means 2 is then driven in the direction indicated by an arrow in FIG. 1 the vehicle wheel 8 and the two support wheels 3', 3" will be driven in the directions of the arrows. This of course means that the vehicle moves to the left according to FIG. 1.

The apparatus now described is very simple in its construction and owing to the light and handy construction it is also very easy to operate.

Although the invention has been described in connection with an apparatus for moving of vehicles it is obvious that the apparatus is not in any sense limited to such a use but may be used for a variety of purposes. It is thus possible to brake a vehicle instead of pushing it and it is of course not necessary to accomplish a turning or rotating movement in addition to a pushing or braking movement.

I claim:

1. Drive apparatus, including a support carriage (3) which supports a drive roller (2) driven by a motor (1) and provided to act upon an object such as a vehicle wheel (8) preferably for rotating the latter, characterized in that the support carriage comprises a front support roller (3') and a rear support roller (3"), that the drive roller (2) is located above said support rollers with the rotation centre thereof located in a vertical plane intermediate corresponding vertical planes through the respective rotation centres of the support rollers (3', 3"), that the support rollers and the drive roller are so dimensioned that the latter (2) by insertion of the drive apparatus in the wedge-shaped space relation between said object (8) and the floor can be brought into contact with said object and that further the drive roller (2) by means of spring elements (7) is normally kept out on contact with the support rollers (3', 3") but when pressed against the object against the action of the spring force will be brought into friction contact with the support rollers to act upon the latter as well as upon the object (8).

2. Drive apparatus as claimed in claim 1, characterized in that the support carriage also supports a motor (1) which preferably by means of transmission means (4) rotates the drive roller (2), and a handle (6) which preferably constitutes a protection cover for cables and hoses for supplying the motor with power as well as control means (5) for controlling the drive action.

3. Drive apparatus as claimed in claim 1, characterized in that the drive roller (2) is provided to act simultaneously on both support rollers for rotating them in the same direction.

* * * * *